United States Patent [19]

Bremmer et al.

[11] Patent Number: 4,799,112
[45] Date of Patent: Jan. 17, 1989

[54] METHOD AND APPARATUS FOR RECORDING DATA

[75] Inventors: Robert A. Bremmer; Vladimir Kovner, both of Oklahoma City, Okla.; Dennis C. Stone, Simi Valley, Calif.

[73] Assignee: Magnetic Peripherals Inc., Minneapolis, Minn.

[21] Appl. No.: 16,166

[22] Filed: Feb. 19, 1987

[51] Int. Cl.$^4$ .................. G11B 27/36; G11B 5/09
[52] U.S. Cl. ........................................ 360/31; 360/51
[58] Field of Search .................. 360/25, 31, 51, 46; 324/212

[56] References Cited

U.S. PATENT DOCUMENTS

| | | |
|---|---|---|
| 4,079,942 | 3/1978 | Kunen . |
| 4,190,860 | 2/1980 | Sommers et al. . |
| 4,220,922 | 1/1978 | Ikeguchi . |
| 4,314,287 | 2/1982 | Freeman et al. . |
| 4,338,683 | 7/1982 | Furukawa et al. . |
| 4,348,699 | 5/1980 | Tsuchiya et al. . |
| 4,351,044 | 9/1982 | Imanaka et al. . |
| 4,357,635 | 11/1982 | Hasegawa . |
| 4,388,713 | 6/1983 | Tatsuguchi . |
| 4,422,110 | 12/1983 | Reynolds . |
| 4,492,992 | 1/1985 | Rooney et al. . |
| 4,514,771 | 4/1985 | Stark et al. . |
| 4,530,018 | 7/1985 | Hoshino et al. . |
| 4,539,667 | 9/1985 | Fujiie . |
| 4,546,461 | 10/1985 | Isobe . |

OTHER PUBLICATIONS

Young, Marks, "Constant-Density Recording Comes Alive with New Chips," *Electronic Design*, Nov. 13, 1986.

Popa, John, "Design Techniques for the Saturation Magnetic Recording Process," Masters Thesis submitted to Oklahoma State University, May 1972.

"Commodore 1541 Disk Drive User's Guide," Commodore Business Machines Electronics Ltd., Sep. 1982, pp. 3, 28, 64 and 65.

*Primary Examiner*—Vincent P. Canney
*Attorney, Agent, or Firm*—Joseph A. Genovese; Robert M. Angus; Richard E. Billion

[57] ABSTRACT

A method and apparatus for increasing the amount of data capable of being stored in a magnetic storage device is disclosed. Basically, a magnetic characteristic of the disk to head interface is measured at several locations on the disk. The frequency for writing and reading the data is optimized in terms of the required resolution and the magnetic measurement. The read and write modes are then varied, based upon the optimized frequency, such that data is written on the disk at a frequency substantially equal to the optimized frequency and read from a disk having data recorded at the optimized frequency.

27 Claims, 5 Drawing Sheets

BLOCK DIAGRAM OF ZONED BIT DENSITY RECORDING

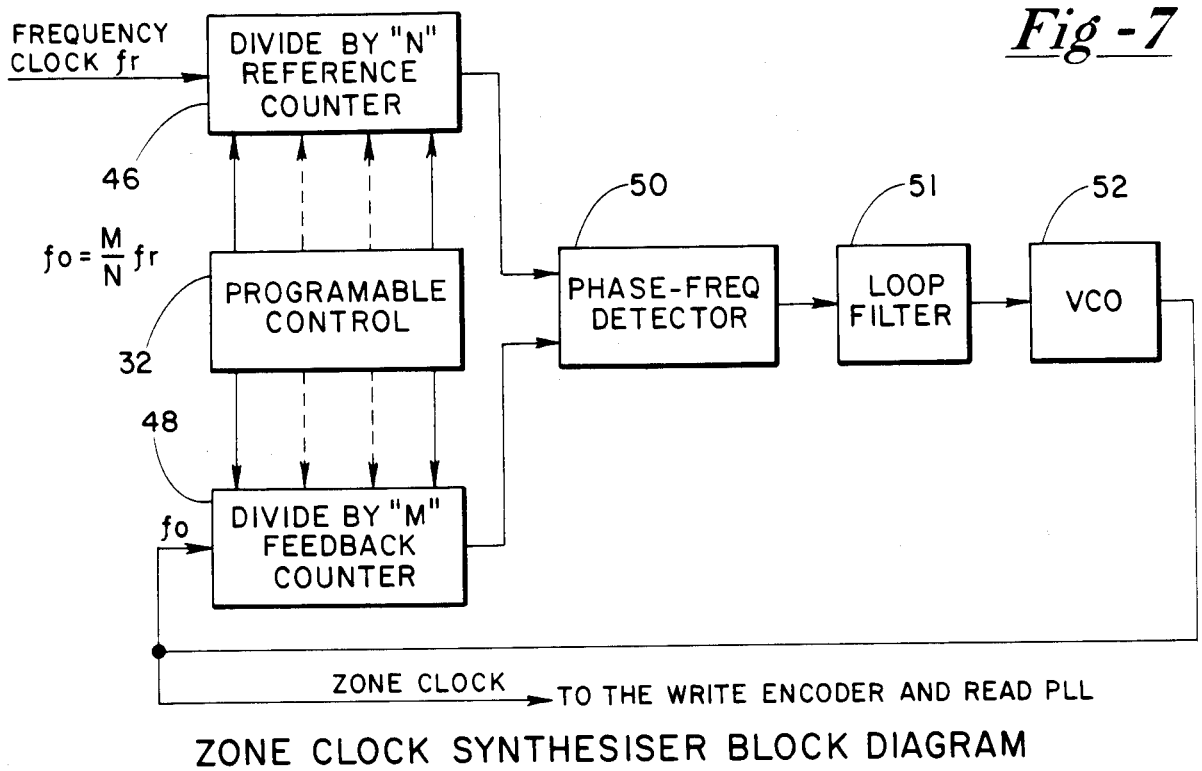
ZONE CLOCK SYNTHESISER BLOCK DIAGRAM
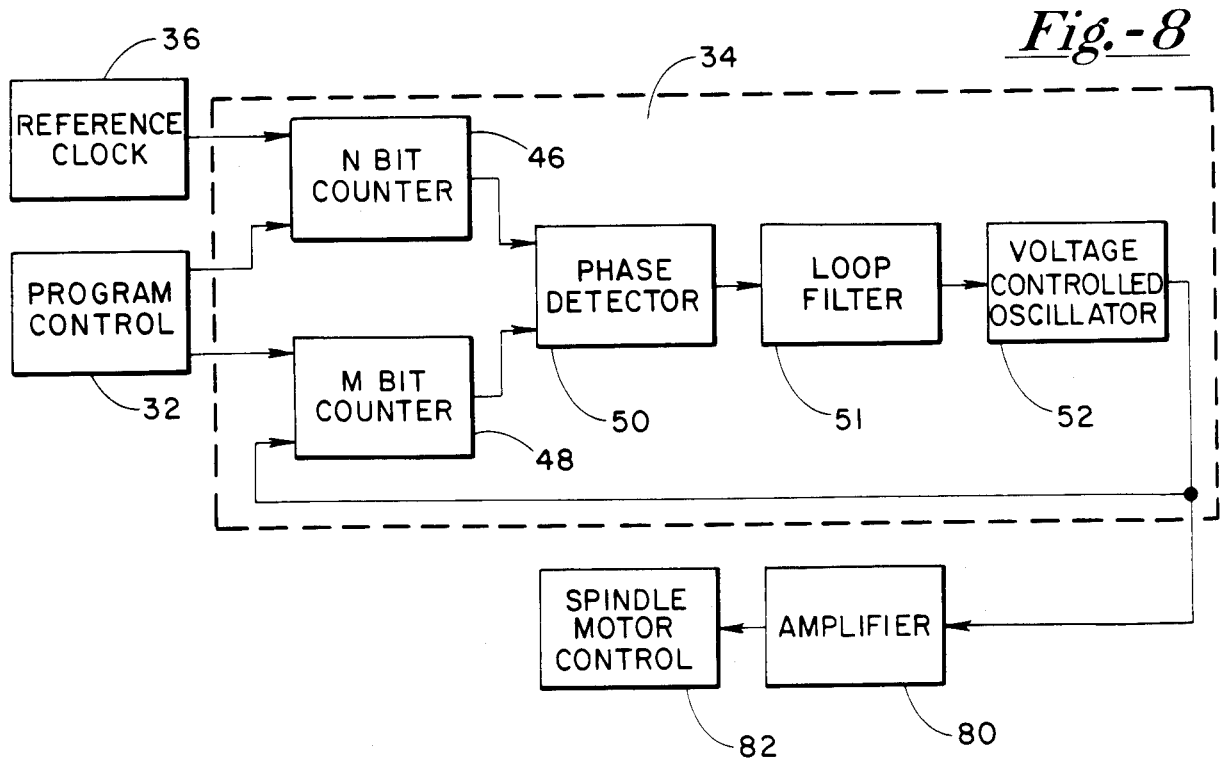

METHOD AND APPARATUS FOR RECORDING DATA

BACKGROUND OF THE INVENTION

Magnetic disks are commonly used to store data for computer applications. Disks are divided into a number of concentric circular tracks and data is stored along these tracks as individual magnetized portions of the track. A transducer having a flux path and a gap is used to magnetize the track. The gap is passed near the disk. By changing the magnetic flux passing through the gap individual portions of the track are magnetized. The same transducer is also used to read the data off the disk.

It is desirable to maximize the amount of data that can be stored on a disk in order to save space and reduce the number of disks needed to store a particular amount of data. Several methods are currently used to store data on a disk. One method writes or inputs the data onto the disk at a fixed frequency as the magnetic disk rotates at a fixed angular velocity. A major drawback associated with this method relates to data density, which is the amount of data which can be stored per inch of track. Since the outer tracks of a disk are longer than the inner tracks, the data density drops off significantly for the outer tracks. Consequently, storage space is wasted on all but the innermost track when using the fixed frequency, fixed angular velocity method of data storage.

The constant data density method provides increased data storage capacity relative to the fixed frequency, fixed angular velocity method. Constant data density is achieved by either varying the write frequency as a function of radius while keeping the angular velocity constant or by varying the angular velocity of the disk as a function of radius while keeping the write frequency constant. Typically, the maximum data density is determined for the inside track and on all the remaining tracks the data is recorded at the same data density.

A drawback of either constant data density method is that read errors increase on the outermost tracks. Variations in magnetic characteristics of the magnetic systems affect the optimal data density from track to track across the disk. For example, variations in the flying height of the slider, the thickness of the magnetic medium, the linear speed of the slider in relation to the disk and the response of the read/write circuitry affect the optimal data density.

Both constant data density methods fail to consider these variations in magnetic characteristics. The consequence is that data is written in particular tracks at frequencies other than the frequency which would produce an optimal data density for that track. Typically, the optimal data density is lower for the outer tracks than for the inner tracks. Since the data density for the inner track is used as the constant for the data density across the disk increased read errors result in the outer tracks where the data density should be lower to account for the changed magnetic characteristics of the system.

To assure that readings from certain tracks do not result in unacceptable read error rates there is a need for a data storage method and apparatus which controls the frequency to produce optimized data density for each track based upon the varying magnetic characteristics on a disk

SUMMARY OF THE INVENTION

A method and apparatus for optimizing the data density on a disk based upon the magnetic characteristics at various locations on the disk is disclosed. The characteristics of the magnetic recording system are measured at various locations on the disk and then the optimum read/write frequency is calculated for each track on the disk. During recording, the write frequency or angular velocity is varied to produce the optimal data density at each track location On readback, the read clock frequency is varied based upon track location

BRIEF DESCRIPTION OF THE DRAWINGS

For a better understanding of the present invention reference may be had to the accompanying drawings wherein:

FIG. 7 depicts the frequency synthesizer portion of the circuit shown in FIG. 6.

FIG. 8 depicts a circuit used to implement an alternative embodiment of the disclosed method.

These drawings and graphs are not intended as a definition of the invention but are provided solely for the purpose of illustrating the preferred embodiments of the invention described below.

DETAILED DESCRIPTION OF THE PREFERRED EMBODIMENT

Figure 1:
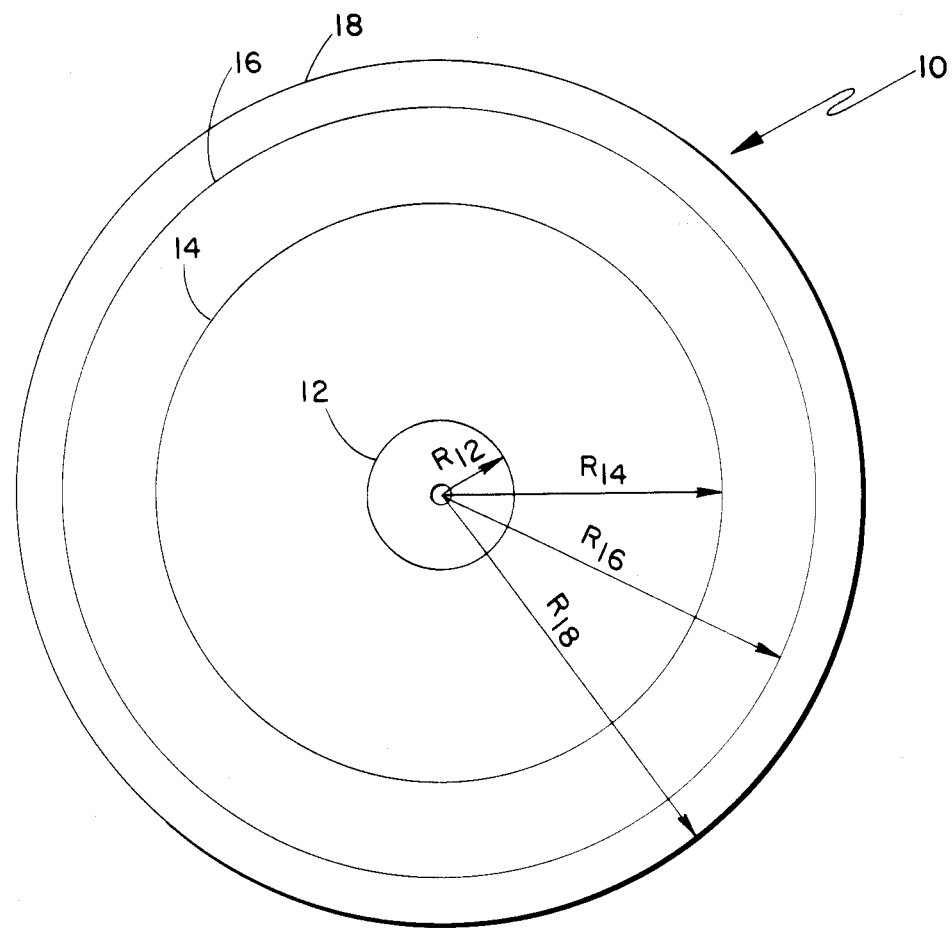
FIG. 1 shows a magnetic disk having a number of data storage tracks.
Figure 2:
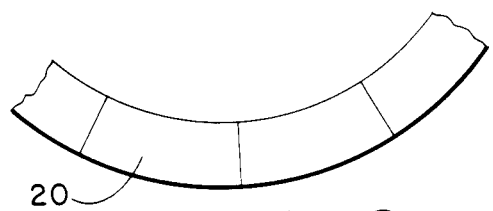
FIG. 2 shows several sectors in one track of a disk.

Referring to FIG. 1, a data storage disk 10 includes a plurality of tracks 12, 14, 16 and 18 each located at a particular radius $R_{12}$, $R_{14}$, $R_{16}$, and $R_{18}$, respectively, from the center of the disk 10. Referring to FIG. 2, each track includes a number of sectors, such as sector 20. Each sector on the disk holds a predetermined number of data bits.

Using this inventive method, the data storage capacity of the magnetic disk 10 is increased relative to the fixed frequency, fixed angular velocity method and the error rate is reduced relative to the error rate associated with either constant data density method. Briefly, the method includes measuring a magnetic characteristic of the data storage system at a number of locations across the data storage disk 10. The data density in each track on the disk 10 is optimized based upon the measured magnetic characteristic. The optimal frequency which produces the optimized data density and the corresponding track location are stored in a microprocessor. In the preferred embodiment, the microprocessor controls the read and write frequencies for the particular tracks. In an alternative embodiment, the microprocessor controls the angular velocity of the disk. In addition, the microprocessor may be programmed to hold the write or read frequency constant for a group of tracks capable of holding the same integer number of sectors.

A new group is formed when a new integer number of sectors will fit onto a particular track at the optimal data density. The disclosed method may be applied to each particular transducer and magnetic disk combination or the results from a particular combination may be used to program microprocessors for disk drives using the same magnetic system combination. The following paragraphs describe the basis for optimizing the data density based on the magnetic characteristics of the disk The method and two embodiments of the apparatus used to carry out the method are also described in detail.

Basis for Optimizing Data Density

The isolated pulse transition is an indicator known in the art to give a measure of overall magnetic system capacity for a particular magnetic system In a paper entitled *Design Techniques for the Saturated Magnetic Recording Process*, a thesis originally submitted in May 1972 to the Faculty of the Graduate College of the Oklahoma State University in partial fulfillment of the requirements for the Degree of Master of Science, the author, John Popa, expresses the isolated pulse transition mathematically in terms of readback voltage (voltage induced in a magnetic read head) as a function of time, as follows:

$$e(t) = c \frac{1}{1 + [kt_1(t/t_1)]^2} \quad \text{(Equation 1)}$$

where
c = constant
k = magnetic system figure of merit
$t_1$ = minimum time between current transitions or minimum reversal time for current Several other mathematical formulations for e(t) for an isolated pulse transition have been developed. Popa's formulation has a reduced number of variables compared to other formulations for e(t) and some of the variables are measurable. Thus, using Popa's formulation, results are more easily interpreted than with more complex equations. The following is an interpretation of the Popa formulation used to optimize the frequency at which data is recorded on a disk based upon a measurable magnetic characteristic.

An isolated pulse transition is written at a frequency so that there is no interaction between consecutive pulses either when written or during readback. A series of pulses may be combined to more closely simulate actual conditions, such as data crowding. The pulses are combined by linear superposition to form a train of pulses as follows:

$$\frac{e(t)}{c} = \frac{1}{1 + [kt_1(t/t_1 - 1)]^2} - \frac{1}{1 + [kt_1(t/t_1 - 2)]^2} + \frac{1}{\ldots 1 + [kt_1(t/t_1 - n)]^2} \quad \text{(Equation 2)}$$

In closed form Equation 2 can be expressed as $$\frac{e(t)}{c} = \sum_{n=1}^{n} \frac{(-1)^{n+1}}{1 + [kt_1(t/t_1 - n)]^2} \quad \text{(Equation 3)}$$

Popa shows the constant K in the above equations, referred to as the magnetic system figure of merit, can be expressed in terms of an easily measured value, $PW_{50}$, as follows:

$$k = \frac{2}{PW_{50}} \quad \text{(Equation 4)}$$

where $PW_{50}$ is the time between readback voltage half amplitude points of a single isolated pulse. Many parameters of a given magnetic system, such as the flying height of the head, the magnetic media used in a system, the radius at which the head is flying, the relative velocity between the head and the magnetic medium, and characteristics of the head, affect the $PW_{50}$ value.

The time between transitions, which is the minimum reversal time for current, in the above equations, can also be expressed in terms of frequency as follows:

$$t_1 = 2/f \quad \text{(Equation 5)}$$

where f is the frequency of interest. It should be noted that the minimum reversal time, $t_1$, will occur over one-half of a cycle. Substituting Equation 4 and Equation 5 into Equation 3 and manipulating algebraically yields the following mathematical form useful for computer analysis:

$$\frac{e(t)}{c} = \sum_{n=1}^{n} \frac{(-1)^{n+1}}{1 + \left[\frac{1}{PW_{50}f}(2ft - n)\right]^2} \quad \text{(Equation 6)}$$

The $PW_{50}$ value and any selected frequency can be used in Equation 6 to yield a voltage value divided by a constant. By dividing the result of Equation 6 at one frequency by the result of Equation 6 by another frequency, the resolution between the two frequencies results. By using equation 6, the optimum resolution for a magnetic system is approximated by an iterative process, the details of which are explained in the following paragraphs.

The first step is to measure $PW_{50}$. Once $PW_{50}$ is measured, an estimate is made of the optimal frequency and the value obtained from equation 6 is used to calculate resolution. Resolution is a comparison of the readback voltage of a pulse as written to the readback voltage of a recovered isolated pulse. More strictly defined resolution equals the readback voltage amplitude of a train of pulses recorded at the highest data frequency divided by the readback voltage amplitude of a train of pulses recorded at the lowest data frequency for the particular recording system.

As is known in the art, data is encoded using one of several coding schemes in order to pack more data onto a disk. For each particular coding scheme used in a magnetic system there is a particular error rate associated with a particular resolution. Therefore, knowing the coding scheme for a magnetic system, a resolution is selected with an error rate less than the value specified. Each particular coding scheme also has a range of frequencies associated with it. The highest recording frequency in the range is related to the lowest recording frequency in the range by a constant.

In a magnetic system a relationship exists between resolution, error rate, frequency and data density. The common thread in the relationship between resolution, error rate, frequency and data density is the amount of interaction between pulses. As the data density or the frequency at which data was written increases, the interaction between recovered pulses also increases. As the interaction between pulses increases the readback voltage amplitude of a pulse train decreases. Since resolution is a comparison of the amplitude of the readback voltage of actual highest frequency pulse train to the readback voltage for the actual lowest pulse train it follows that the resolution drops as the interaction between pulses increases. The error rate also increases as interaction between the pulses increases since each pulse becomes less distinguishable from the others.

Optimizing the data density for a particular track is an iterative process of choosing the highest frequency that produces a particular resolution. Now turning to FIG. 3, this iterative process will be detailed.

The initial starting step in the iterative process is to select an actual read/write frequency for a particular track as indicated by box 100, for a particular track. As indicated by box 102, the track position is determined and the previously determined value for $PW_{50}$ is recalled from memory. Employing the preferred embodiment of the method, the starting track is the outermost track and the starting frequency is one known to be greater than the optimal frequency. It should be obvious to one skilled in the art that the initial starting point could also be the innermost track with the starting frequency known to lesser than the optimal frequency. Of course, if the innermost track is selected as the starting point, many of the steps that follow would have to be reversed. In Box 104, the initially selected frequency and the recalled $PW_{50}$ to calculate e/t)/c using equation 6.

The lowest recording frequency in the range of recording frequencies is then determined in Box 106 by dividing the actual frequency used in 104 by the constant which relates the highest recording frequency in the range to the lowest recording frequency in the range of recording frequencies. Thus, the selected frequency is assumed to be the high frequency. The constant is actually the ratio between the actual highest read/write frequency and the lowest read/write frequency.

In Box 108, e(t)/c for the lowest data frequency is determined using the frequency determined in Box 106 and the recalled $PW_{50}$ value for the particular track location.

As depicted by Box 110, the resolution is determined by dividing the result of Box 104 by the result from Box 108 which is stored in address J. It should be noted that the value for resolution is dimensionless since the resolution is the voltage amplitude associated with the highest write frequency divided by the voltage amplitude associated with the lowest write frequency.

The calculated resolution is compared to the desired resolution in decision Box 114. The desired resolution is the same for each track on the disk. If the calculated value is less than a predetermined resolution, the iterative process continues after subtracting a decrement of frequency from the frequency as shown in Box 116. The process is repeated beginning at Box 104.

If the calculated value of resolution is greater than or equal to the predetermined resolution the read/write frequency is considered optimum for the track. The optimum frequency and the track location are stored as shown in Box 120. It should be obvious to those skilled in the art that the calculated value could also be compared to a range of values centered about a particular predetermined value of resolution. The next step is to determine if optimal frequencies have been determined for all the tracks on the disk as depicted by decision Box 122. If not, the next track is treated in a similar fashion.

Since the distance between tracks is small the optimal frequency for the previous, adjacent track is generally selected for the starting read/write frequency for the next track.

Figure 3:
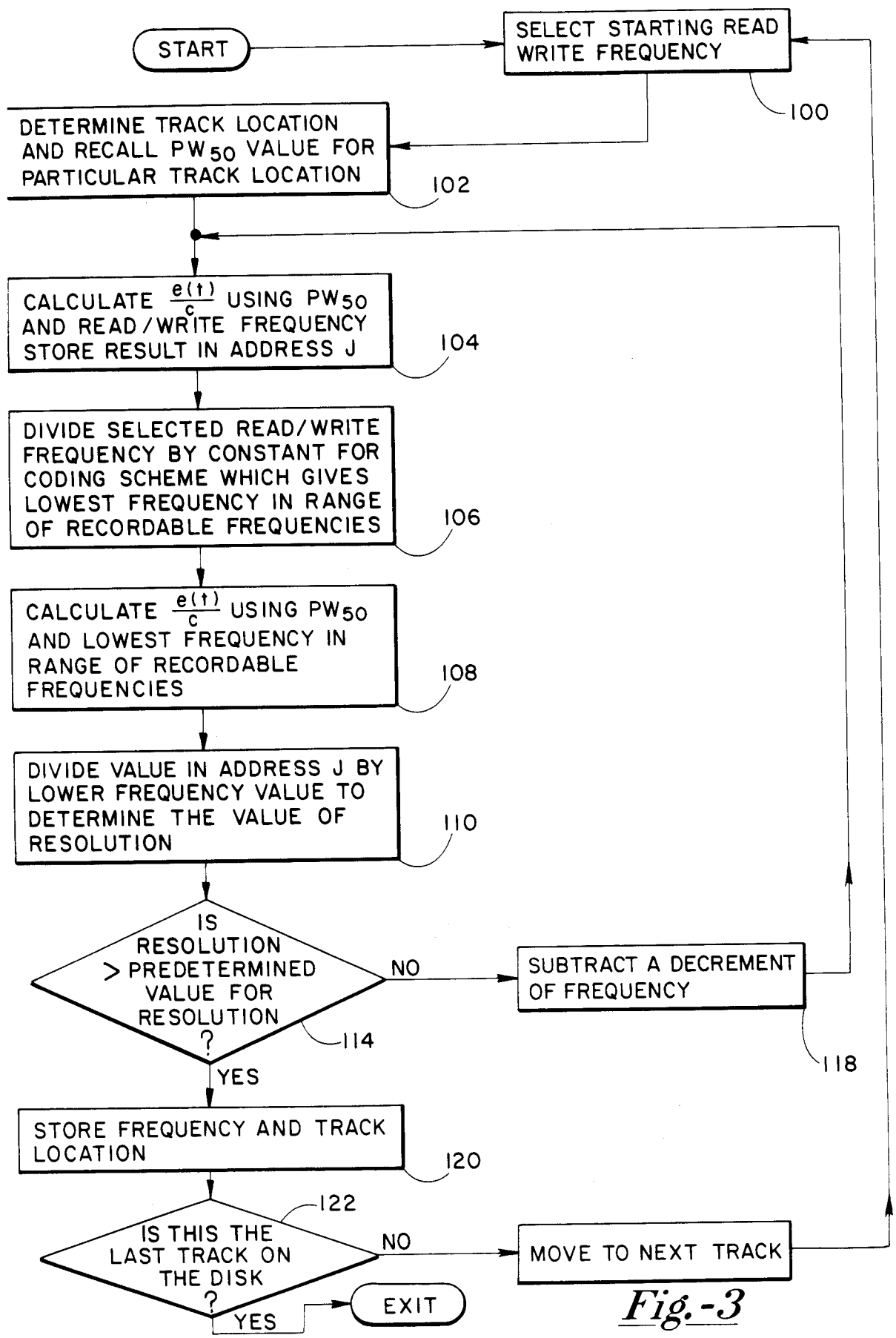
FIG. 3 is a flow chart of the program executed to optimize frequency and data density at a particular track location.

Once all the tracks have been treated according to the iterative process shown in FIG. 3, the process is complete Completion of the iterative process produces a table having an optimized frequency for each track location stored in memory.

The iterative process can be used in several ways to optimize the data density on a magnetic disk. The iterative process can be used to optimize the capacity for one particular combination which comprises a magnetic system. This can then be used to program all similarly manufactured units. The process can also be applied to each unit upon manufacture. A particular storage device could also be programmed to perform the iterative process.

Figure 4:
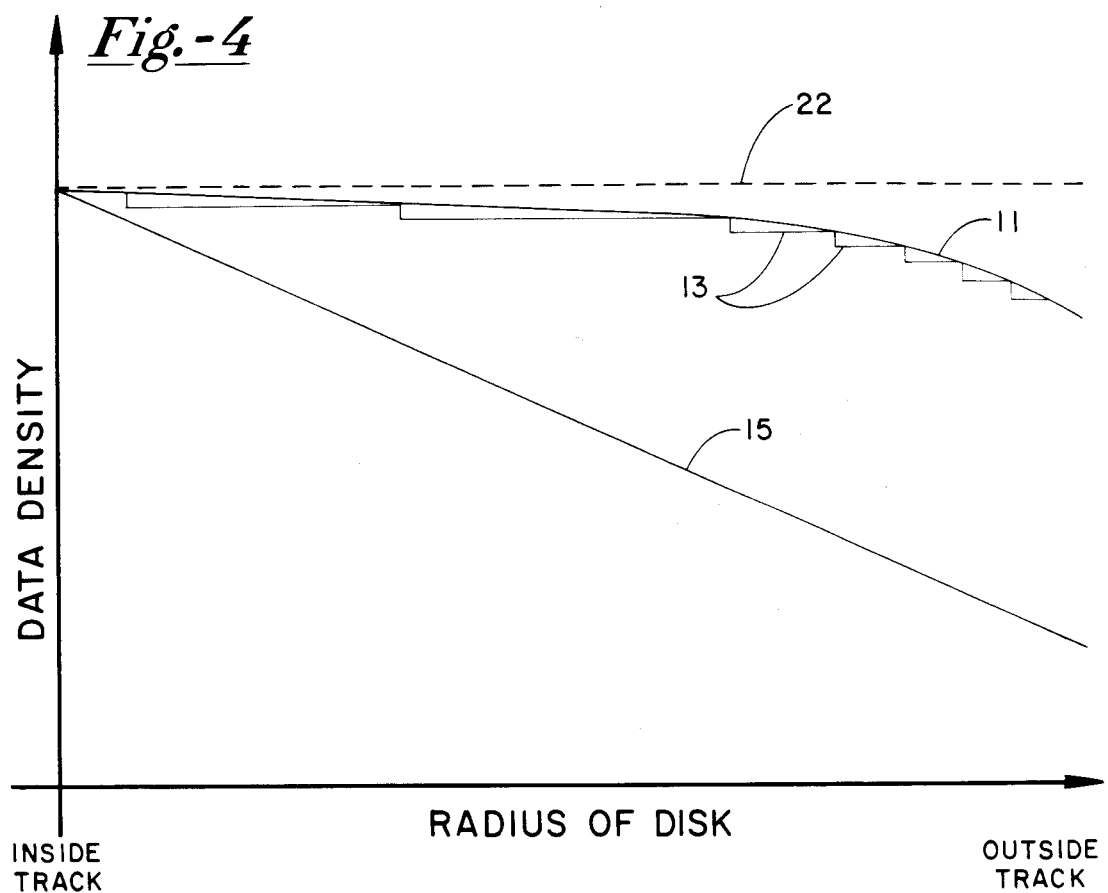
FIG. 4 is a graph comparing the capacity of a disk using the disclosed method compared with the capacity of a disk using the constant data density method and the constant frequency method.

FIG. 4 compares the data density of several recording methods as a function of track location to the data density achieved by using the disclosed optimal data density method. The constant data density method is shown by broken line 22. The constant angular velocity method is shown as line 15. The curve 11 shows the data capacity of the disclosed method as a function of the radius of the disk. As can be seen, the data density of the disclosed optimization method approaches the data density of the constant data density method. The data density on the inside track is the same with all three methods. The data density associated with the constant angular velocity method declines linearly as a function of radius from the inside track. The data density associated with the disclosed optimization method more closely approaches constant data density, however, it drops toward the outer tracks as shown by curve 11.

Figure 5:
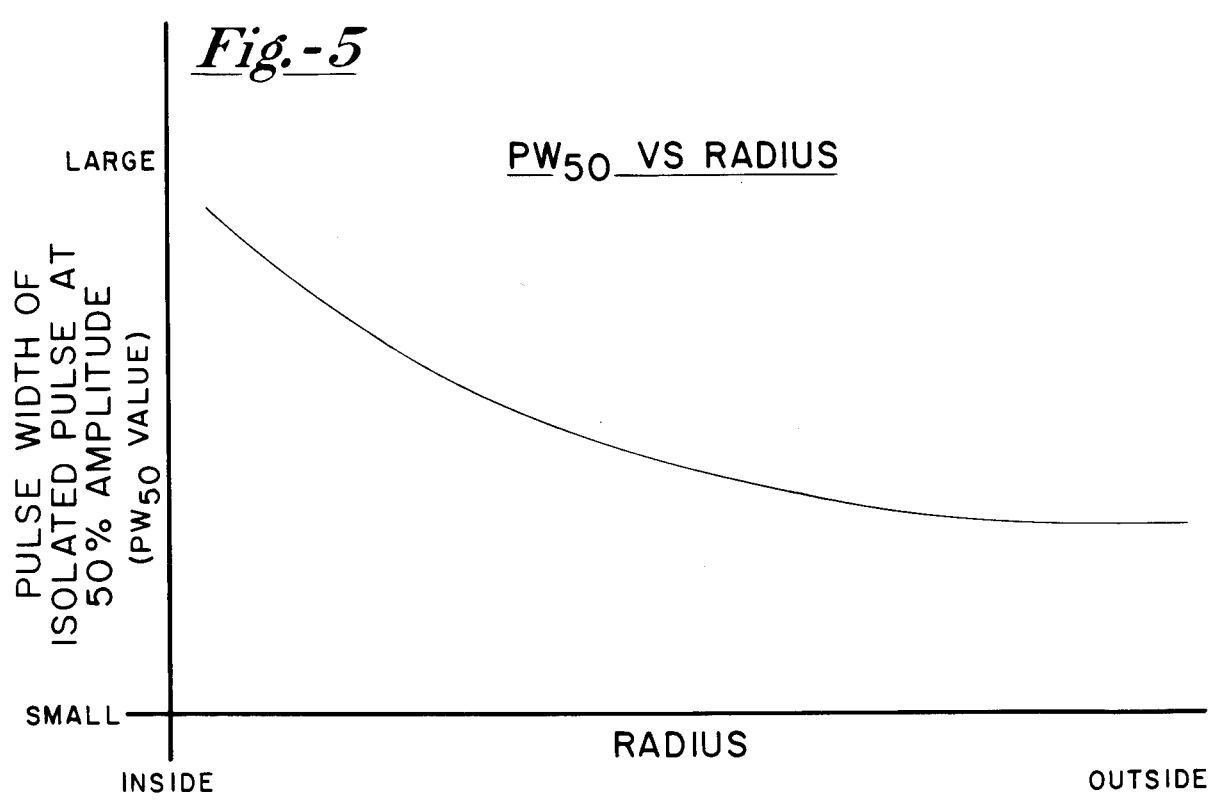
FIG. 5 is a graph showing the relationship between $PW_{50}$, and the radius of a magnetic disk.

FIG. 5 shows the general relationship between $PW_{50}$ and the radius on a disk where $PW_{50}$ is measured. Basically, the value of $PW_{50}$ is smallest on the outer tracks of the disk and increases to a larger value at the innermost track. The drop in data density is related to the nonlinear characteristic of the $PW_{50}$ value as shown in FIG. 5. If the density at which data is being written stays constant, increased amounts of read errors would result. The disclosed optimization method corrects for this decrease in the magnetic capability of the magnetic system by decreasing the write data density. The resolution remains substantially constant across the disk and therefore no higher incidence of read errors occurs on the outer tracks than on the inner tracks.

As an additional step the tracks may be grouped into bands. After determining the optimal frequency using the disclosed method, the number of sectors each track can hold is calculated and the tracks capable of holding the same integer number of sectors are grouped together. Each sector holds a predetermined number of bits and the disks are formatted in terms of sectors. In terms of data storage, portions of sectors are not usable. It also takes time to switch frequencies. Consequently to simplify the method during operation and to increase the speed of the storage system, the read/write frequency is held constant throughout the group of tracks. The read/write frequency is changed when a new integer number of sectors can be fit on the track at the previously determined optimal frequency. For example, three adjacent tracks may each be able to hold 10.3, 10.5 and 10.9 sectors a piece. Each track can hold 10 sectors. Rather than switch write frequencies for each track to achieve optimal data density for each track, the write frequency is held constant for each track in the group. The write frequency is not changed until a new integral number of sectors can be held on a track at the optimal data density for the track. When a different integer number of sectors can be held, the write frequency is changed to the write frequency of the shortest track capable of holding the same integer number of sectors at the optimized frequency. It should be noted that a particular group may only include one track. Previously tracks were grouped arbitrarily and optimal read/write frequencies were ignored when grouping the tracks.

The result of this added step is that the data capacity of a storage disk drops slightly from the optimal curve 11 shown in FIG. 4. As can be seen in FIG. 4, the data density decreases incrementally rather than continuously when placing the data in bands and appears as a stair case line 13. The innermost track in the group determines the frequency for the group. The frequency stays constant and then moves to the new optimized data frequency when a new band capable of holding a new integer number of sectors is entered. This is indicated by the vertical line portions of line 13.

The disadvantage of losing some storage capacity is offset by several advantages associated with grouping the tracks. By incorporating this additional step the operation of the method is simplified at no cost in terms of usable sectors on each track. Furthermore, since the number of frequency changes is decreased the overall speed of the system is increased.

If the optimization is done for one particular system and the systems using the same components are "copied," then incorporating the additional step will require the storage of the tracks within a group and the frequency used in the particular group. If each particular storage system has the capability of programming itself, implementing this additional step will require several added programming steps.

It should be noted that only one pulse in a string of pulses is needed to obtain the amplitude necessary to determine resolution at a particular frequency. However, generally several pulses are placed on either side of the pulse thereby forming a train of pulses and substantially eliminating end effects.

It should also be noted that other equations may be used to optimize the write frequency for a given error rate. The above set of mathematical equations is provided as an example of one way, using the readily measured $PW_{50}$ value, the ratio between the highest recording frequency and the lowest recording frequency for a particular coding scheme and an iterative process, for optimizing the write frequency.

First Embodiment

Figure 6:
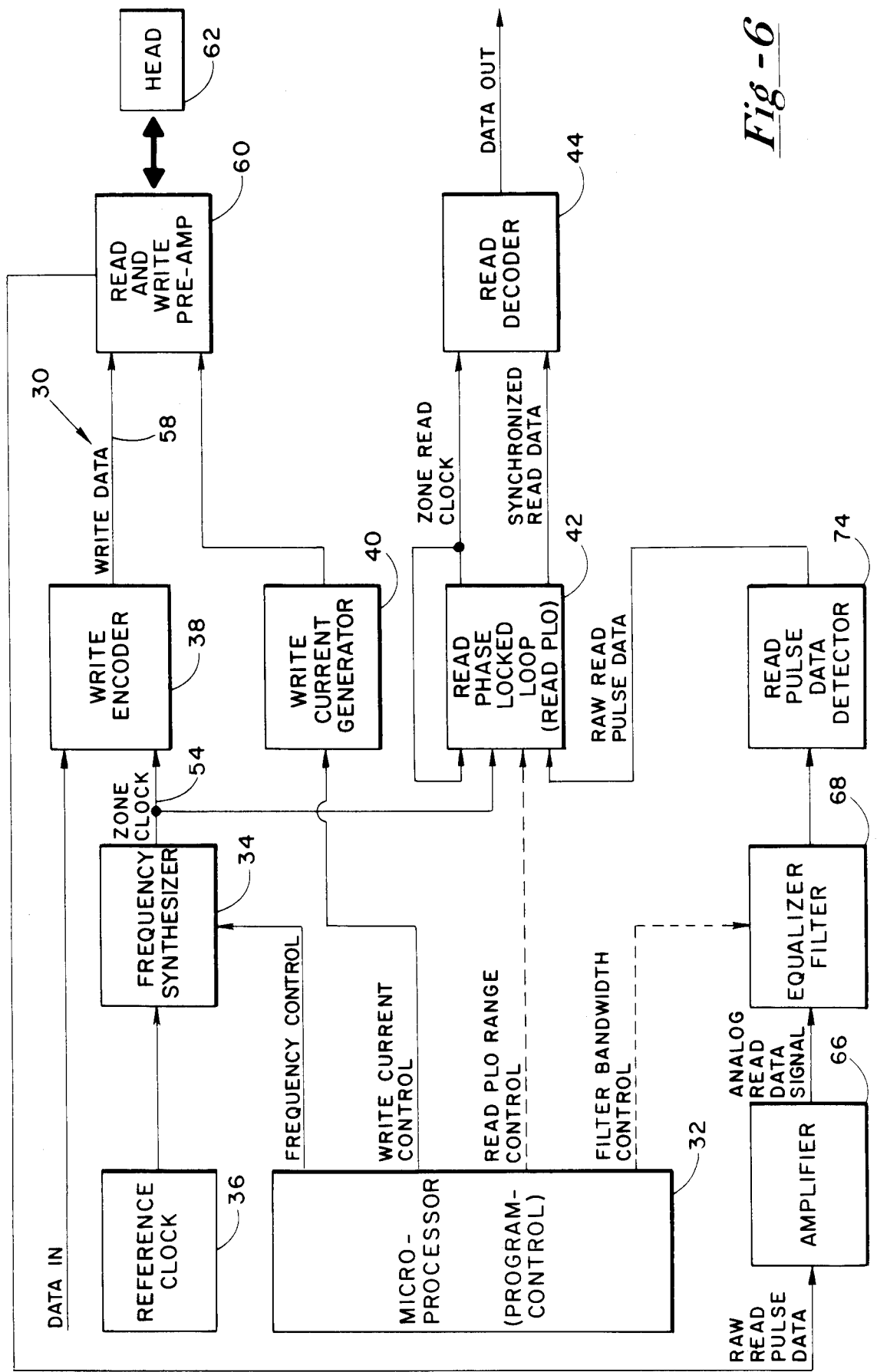
FIG. 6 depicts the circuit used to implement the disclosed method.

The first embodiment of the data read/write circuit 30, shown in FIG. 6, includes a program control 32, a frequency synthesizer 34, a reference clock 36, a write encoder 38, a write current generator 40, a read phase locked loop 42, and a read decoder 44.

As mentioned previously, the optimal frequency and the respective track location are stored in table form in the program control 32 shown schematically in FIGS. 6, 7 and 8. In operation, the track location of the transducer is input to the program control 32. In response to this input, the program control 32 produces a signal which causes the transducer to magnetize data at the optimized frequency for the particular track. The disk in the first embodiment rotates at a constant angular velocity. While the frequency of the transducer is changed to write at the optimized frequency for the particular track.

Now referring to FIGS. 6 and 7, the portion of the circuit which writes the data will be described. The reference clock 36 is a crystal controlled oscillator having a stable and accurate reference frequency or a servo PLO signal that is frequency locked to the rotational speed of the disk. The program control 32 loads a first bit counter 46, referred to as the N counter and a second bit counter 48, referred to as the M bit counter 48 with a division coefficient. The signal from the reference clock 36 is input to the N counter and is divided by the division coefficient stored therein. The resultant output is sent to phase-frequency detector 50. The zone clock signal 54, which is the output from the zone clock synthesizer 34, is fed back to the M counter 48 and divided by the division coefficient stored therein. The output from the M counter is also sent to the phase-frequency detector 50. In the phase-frequency detector 50, the output signals from the N counter 46 and the M counter 48 are compared. The phase-frequency detector 50 produces an output signal proportional to the difference between the two input signals The output from phase-frequency detector 50, also known as the phase error signal, is filtered by the loop filter 51 that also provides the frequency synthesizer with phase locked loop compensation. Voltage-controlled oscillator 52 is controlled by the filtered phase-error signal. The output of the voltage-controlled oscillator (VCO) 52 is the zone clock signal 54. The frequency synthesizer 34 is a programmable phase locked loop that is programmed to produce an output having a frequency equal to the optimal frequency associated with the particular track or zone. It should be noted that the division coefficients in the N bit counter 46 and the M bit counter 48 will stay the same throughout a particular track or zone. The frequency of the zone clock signal 54 is equal reference frequency times the ratio of the division coefficients in M counter 48 and N counter 46 respectively. Mathematically, this can be shown as:

ZONE CLOCK FREQUENCY =

$$\frac{M}{N} \text{ (REFERENCE CLOCK FREQUENCY)}$$

The remaining write circuitry uses the zone clock signal 54 for encoding the write data 58. The zone clock signal 54 and the data to be stored on the magnetic disk 10 are both input to the write encoder 38. The write encoder 38 encodes the data at the frequency of the zone clock signal 54 to produce a write data signal 58. The write data signal 58 is then input to the read-write preamp 60 and, from the preamp, to a read/write head 62 which magnetizes the disk (not shown in FIGS. 6 or 7) at the optimized frequency.

Reading Data

The portion of the circuit 30 for reading the data will now be detailed. The read circuitry includes the read phase locked oscillator 42 which phase locks onto either the zone clock signal 54 or the raw read pulse data. During the times when the circuit is not reading (read mode disable) the circuit locks onto the zone clock signal 54. When the circuit is reading (read enable mode), the read phase locked oscillator 42 locks onto a raw read pulse data. The output of the read PLO 42, the zone read clock signal, is used to produce time windows into which detected data pulses are placed. The read data is detected by the read/write head 62, amplified by read/write preamp 60 and then input into an amplifier 66. The analog read data from the output of the amplifier is processed through the equalizer-filter 68 with optional program bandwidth control. The program control 32 selects the bandwidth for the equalizer filter 68 which depends on the optimal frequency of the zone being read. After filtering, the read signal is sent to the read pulse data detector 74 that detects the peaks of the complex read analog signal waveforms. The output of the read pulse data detector is zone raw pulse data. During the read operation (read enable mode) the read phase locked loop locks onto the raw read pulse data stream and reconstructs a stabilized replica of the read data to produce an output referred, to as the synchronized read data. The read phase locked loop 42 also has an optional range control to optimize the performance of read PLO 42 for different zones which would have different frequencies. The program control 32 determines the read PLO range control signal based upon the zone being read. The zone read clock and zone synchronized read data have fixed timing relationship with respect to one another. Both signals are sent to the read decoder 44 to decode and reproduce the data.

Second Embodiment

Another method for producing a disk having optimized data density in various tracks or zones would be to hold the write frequency constant while varying the angular velocity of the disk 10. A schematic circuit diagram for implementing this method is shown in FIG. 8. The program control 32 loads both the N bit counter 46 and the M bit counter 48 with division coefficients. The reference clock signal is also input to the N bit counter 46.

The circuit shown in FIG. 8 includes the frequency synthesizer 34 which functions as described previously. The zone clock signal 54, which is the output of the zone clock synthesizer, is used to control the angular velocity of the disk 10 (not shown in FIG. 8). The zone clock signal 54 is amplified by amplifier 80 and is then sent to the spindle motor 82. The spindle motor control 82 would then control the angular velocity of the spindle (now shown). The angular velocity would be a function of the frequency of the zone clock signal 54.

It should be understood that the foregoing description of the invention is only illustrative and explanatory thereof, and that other means and techniques can be employed without departing from the full scope of the invention as set forth in the appended claims.

What is claimed is:

1. A data storage device including a read/write head and a magnetic disk which form the disk to head interface, the magnetic disk capable of retaining data pulses recorded at various frequencies, the amplitude of the readback voltage of a pulse train varying as a function of the selected frequency, the amplitude of the readback voltage of a pulse train recorded at the selected frequency divided by the amplitude of the readback voltage of a pulse train recorded at a lower frequency yielding the resolution, the magnetic system manufactured with disks formatted by a process comprising the steps of:
   determining a magnetic characteristic for the head to disk interface for each track on the magnetic disk; and
   using the determined magnetic characteristic for each track to select a frequency for each track that will produce a substantially constant resolution in each track across the disk.

2. The process of claim 1 wherein determining the magnetic characteristic for each track is comprised of the steps of:
   measuring the pulse width at fifty percent amplitude of an isolated pulse in a plurality of tracks on the disk; and
   generating a curve from the known measured pulse widths and the corresponding track locations to determine pulse width values for the tracks on the disk having no measured pulse width value.

3. The process of claim 1 wherein the step of using the determined magnetic characteristic to determine a frequency that produces a substantially constant resolution for each track of the disk further comprises the steps of:
   selecting a starting frequency for each track;
   calculating the amplitude of the readback voltage for a pulse train recorded at the selected starting frequency using the selected starting frequency and the determined magnetic characteristic;
   dividing the selected starting frequency by a constant to arrive at the lower frequency;
   calculating the amplitude of the readback voltage for a pulse train recorded at the lower frequency using the lower frequency and the determined magnetic characteristic;
   determining the resolution;
   comparing the calculated resolution to the desired high value of resolution and a desired low value of resolution and adding an increment of frequency to the selected frequency and if the resolution is larger than a desired high value, subtracting a decrement of frequency from the selected frequency and redetermining the resolution, and if the resolution is below a desired low value adding an increment of frequency to the selected frequency and redetermining the resolution until it is between the desired high value and the desired low value of resolution.

4. The process of claim 3 wherein the step of determining the magnetic characteristic for the head to disk interface further comprises measuring the pulse width at fifty percent amplitude of an isolated pulse.

5. The process of claim 4 wherein the steps of calculating the amplitude of the readback voltage for the starting frequency pulse train and calculating the amplitude of the readback voltage for the lower frequency pulse trains further comprises substituting the pulse width at fifty percent amplitude for the particular track and the frequency into the following equation:

$$\frac{e(t)}{c} = \sum_{n=1}^{n} \frac{(-1)^{n+1}}{1 + \left[\frac{1}{PW_{50}f}(2ft - n)\right]^2}$$

where
$PW_{50}$ = pulse width at fifty percent amplitude
$f$ = frequency
$e(t)$ = voltage as a function of time
$c$ = a constant.

6. The process of claim 3 wherein the step of selecting a starting frequency includes using the frequency which produced the desired resolution for an adjacent track.

7. A method of determining the read/write frequency for each track of a magnetic disk in a magnetic system which also includes a read/write head, the method comprising the steps of:
  determining a magnetic characteristic of the magnetic system for each track of the magnetic disk;
  selecting a first frequency for each track;
  determining the voltage amplitude as a function of time for a train of pulses occurring at the first frequency using the first frequency and the magnetic characteristic for the track;
  selecting a second frequency lesser than the first frequency;
  determining the voltage amplitude as a function of time for a train of pulses occurring at the second frequency using the magnetic characteristic for the track and the second frequency;
  dividing the value of the voltage amplitude as a function of time for the train of pulses occurring at the first frequency by the value of the voltage amplitude as a function of time for the train of pulses occurring at the second frequency to yield a value called the calculated resolution;
  selecting a desired resolution, the desired resolution having an associated error rate which is less than the specified error rate; and
  comparing the calculated value of the resolution to a desired value of resolution to determine if it is within a desired range of the desired value of the resolution.

8. The method of claim 7 further comprising the step of adding an increment of frequency to the first frequency when the calculated resolution is greater than the desired range of resolution and redetermining the resolution.

9. The method of claim 7 further comprising the steps of subtracting a decrement of frequency from the first frequency when the calculated resolution is less than the desired range of resolution and redetermining the resolution.

10. The method of claim 7 wherein the step of selecting the first frequency further comprises selecting the frequency that produced a resolution within the desired range for the adjacent track as the first frequency for a particular track.

11. The method of claim 7 wherein the step of selecting the second frequency further comprises dividing the first frequency by a constant which is a function of the coding scheme used in the magnetic system, the constant converting the first frequency to the lowest frequency in the range of the recording frequencies for the coding scheme.

12. The method of claim 11 wherein the steps of determining the magnetic characteristic further comprises the step of measuring the time between half amplitude points of an isolated pulse in every track on the magnetic disk.

13. The method of claim 11 wherein the steps of determining the magnetic characteristic further comprises the steps of:
  measuring the time between half amplitude points of an isolated pulse in a plurality of tracks; and
  generating a curve that fits the measured points and determining the time between half amplitude points of an isolated pulse in the unmeasured tracks based upon the generated curve.

14. The method of claim 13 wherein the steps of determining the voltage amplitude as a function of time further includes the step of substituting the first or second frequency and the time between half amplitude points of an isolated pulse for the track into the following equation:

$$\frac{e(t)}{c} = \Sigma \frac{(-1)^{n+1}}{1 + \left[\frac{1}{PW_{50}}(2ft - n)\right]^2}$$

where
  $PW_{50}$ = the time between half amplitude points of an isolated pulse in the particular track
  f = frequency of the pulse train
  e(t) = voltage as a function of time; and
  c = a constant.

15. The method of claim 7 wherein the step of selecting a desired resolution comprises selecting the same desired resolution and the same desired range for each track on the disk.

16. A method for reading and writing data at an error rate less than the specified value in a data storage device including a magnetizable disk with tracks and a read/write head which form a disk to head interface, and a memory, the data storage device encoding data before recording and decoding data after reading according to a coding scheme, the data storage device capable of recording data through a range of frequencies, the highest frequency in the range related to the lowest frequency in the range by a constant which is a characteristic of the coding scheme being used, the amplitude of the readback voltage of the high frequency in the range divided by the voltage amplitude of the lowest frequency in the range yielding resolution, each resolution having a specific error rate associated therewith, the method comprising the steps of:
  determining a magnetic characteristic of the magnetic disk to read/write head interface for each track on a disk;
  dividing the selected high frequency by the constant for the particular coding scheme to produce the lowest frequency in the range for a track;
  determining the amplitude of the readback voltage for the selected high frequency and the lowest frequency in the range using the frequency and the magnetic characteristic;
  calculating the resolution;
  selecting a range of desired values of resolution, the error rates of the resolutions in the range being less than that specified; and
  determining if the calculated resolution falls within the range of desired values of resolution and if the calculated value of resolution is less than the desired range, subtracting a decrement of frequency from the selected frequency and recalculating the resolution, and if the calculated resolution is greater than the desired range of resolution adding an increment of frequency to the selected frequency.

17. The method for reading and writing data as recited in claim 16 further comprising the steps of:
  storing each track location and the selected frequency for the particular track in the memory;

comparing the track location of the read/write head to the stored track location in the memory; and recalling the selected frequency corresponding to the track location of the read/write head.

18. The method of claim 17 further comprising the step of altering the magnetic system such that data is written and read at the selected frequency for the track.

19. The method of claim 18 wherein the step of altering the magnetic system further comprises producing a frequency equal to the recalled selected frequency for reading and writing data at the track location.

20. The method of claim 18 wherein the step of altering the magnetic system further comprises changing the angular velocity of the magnetic disk to a level where the data is written and read on the magnetic disk at the recalled selected frequency.

21. The method of claim 17 further comprising the steps of:

determining the number of bits a track will hold at the selected frequency for the track;

dividing the number of bits the track will hold by the number of bits each sector will hold; and altering the magnetic system when the number of sectors capable of being held in a first track is a different integer number than the number of sectors capable of being held in a track adjacent to the first track.

22. An apparatus for reading and writing data in a storage device having a read/write head and a magnetizable disk with tracks, the apparatus comprising:

means for storing and recalling a track location and a read/write frequency for each track on the disk;

means for determining the position of the read/write head;

means for producing data pulses on the magnetizable disk at a frequency substantially equal to the frequency stored in the storing and recalling means which corresponds to the location determined by the position determining means; and means for reading data recorded at various frequencies from the magnetizable disk, the read frequency being substantially equal to the frequency stored in the storing and recalling means which corresponds to the location determined by the position determining means.

23. The apparatus of claim 22 further comprising a frequency synthesizer which produces a zone clock signal having a changeable frequency.

24. The apparatus of claim 23 wherein the means for producing data pulses comprises a read/write head writing at the zone clock frequency and wherein the means for reading data comprises a read phase locked loop using the zone clock signal to synchronize the raw read data.

25. The apparatus of claim 23 wherein said means for producing data pulses is means for varying the angular velocity of the magnetizable disk in response to the frequency of the zone clock signal, the angular velocity being varied such that a read-write head writing at a constant frequency will produce data pulses on the magnetizable disk at a frequency substantially equal to the frequency stored in the storing and recalling means for the position of the read/write head determined by the position determining means.

26. The apparatus of claim 23 wherein said frequency synthesizer further comprising a frequency generator:

a reference clock which produces a reference signal;

a first bit counter storing an integer used to divide the frequency of the reference clock to produce a divided reference clock signal;

a zone clock signal;

a second bit counter storing an integer used to divide the frequency of the zone clock signal to produce a divided zone clock signal;

a phase-frequency detector which receives the divided reference clock signal and the divided zone clock signal and produces an output proportional to the phase difference between the two received signals;

a loop filter which receives the phase-frequency detector output and produces a voltage output in response to the frequency of the phase-frequency detector output; and a voltage controlled oscillator which produces the zone clock signal, the frequency of the zone clock signal varying in response to the level of the voltage output of the loop filter.

27. The apparatus of claim 26 further comprising a spindle motor control which controls the angular velocity of a disk in response to the frequency of the zone clock signal.

* * * * *